(12) United States Patent
Gauthier

(10) Patent No.: US 11,413,972 B2
(45) Date of Patent: Aug. 16, 2022

(54) CONTROL SYSTEM TO ELIMINATE POWER TRAIN BACKLASH

(71) Applicant: Atieva, Inc., Newark, CA (US)

(72) Inventor: Jean-Philippe Gauthier, San Francisco, CA (US)

(73) Assignee: Atieva, Inc., Newark, CA (US)

( * ) Notice: Subject to any disclaimer, the term of this patent is extended or adjusted under 35 U.S.C. 154(b) by 793 days.

(21) Appl. No.: 16/250,122

(22) Filed: Jan. 17, 2019

(65) Prior Publication Data

US 2020/0231048 A1 Jul. 23, 2020

(51) Int. Cl.
*B60L 15/34* (2006.01)
*B60L 15/20* (2006.01)
*B60K 6/26* (2007.10)

(52) U.S. Cl.
CPC ............ *B60L 15/34* (2013.01); *B60L 15/20* (2013.01); *B60K 6/26* (2013.01); *B60L 2240/32* (2013.01); *B60L 2240/423* (2013.01); *B60Y 2200/91* (2013.01); *B60Y 2200/92* (2013.01)

(58) Field of Classification Search
CPC ...... B60L 15/34; B60L 15/20; B60L 2240/32; B60L 2240/423; B60K 6/26; B60Y 2200/91; B60Y 2200/92
USPC .......................................................... 701/22
See application file for complete search history.

(56) References Cited

U.S. PATENT DOCUMENTS

| 2003/0001391 A1* | 1/2003 | Kuang | B60L 15/2063 290/40 C |
|---|---|---|---|
| 2004/0063533 A1* | 4/2004 | Silveri | B60K 6/48 475/116 |
| 2018/0312078 A1 | 11/2018 | Message et al. | |
| 2018/0312081 A1 | 11/2018 | Hancock et al. | |
| 2020/0079350 A1* | 3/2020 | Morrison | B60W 20/40 |
| 2020/0114913 A1 | 4/2020 | Cosfeld et al. | |

FOREIGN PATENT DOCUMENTS

| JP | 07015804 A | 1/1995 |
|---|---|---|
| JP | 2007106171 A | 4/2007 |
| JP | 2015077834 A | 4/2015 |
| JP | 2017093125 A | 5/2017 |
| JP | 2018057169 | 4/2018 |

(Continued)

OTHER PUBLICATIONS

Office Action for Japanese Patent Application No. 2019-225337, dated Jun. 16, 2021, along with English translation, 5 pages.

(Continued)

*Primary Examiner* — Gertrude Arthur Jeanglaude
(74) *Attorney, Agent, or Firm* — Brake Hughes Bellermann LLP

(57) ABSTRACT

A powertrain backlash control system is provided for use with an electric vehicle (EV), where the EV uses at least one powertrain to provide forward vehicle motion and at least one additional powertrain to provide rearward vehicle motion. The control system eliminates backlash by maintaining a positive motor torque within each powertrain when the vehicle is in-gear, thus applying a minimum forward torque demand to the powertrain dedicated to forward motion and applying a minimum reverse torque demand to the powertrain dedicated to rearward motion.

17 Claims, 6 Drawing Sheets

(56) References Cited

FOREIGN PATENT DOCUMENTS

| | | |
|---|---|---|
| JP | 2018057169 A | 4/2018 |
| WO | 2018229140 A1 | 12/2018 |

OTHER PUBLICATIONS

Office Action for Korean Application No. 10-2019-0176022, dated Feb. 4, 2021, along with English translation, 12 pages.
Office Action for Japanese Application No. 2019-225337, dated Mar. 16, 2021, along with English translation, 7 pages.

* cited by examiner

CONTROL SYSTEM TO ELIMINATE POWER TRAIN BACKLASH

FIELD OF THE INVENTION

The present invention relates generally to an electric vehicle and, more particularly, to a control system configured to eliminate the mechanical backlash in an electric vehicle's powertrain.

BACKGROUND OF THE INVENTION

The components within a vehicle's powertrain transfer the output generated by the vehicle's motor or engine to the vehicle's wheels. Many of these components, for example the transmission, drive shaft and differential, utilize an arrangement of gears to accomplish this power transfer. Due to the limitations of the manufacturing process, as well as the need for a degree of clearance to permit operation at various temperatures, there is a certain level of play between gears, commonly referred to as backlash. FIG. 1 illustrates backlash 101 between two gears 103 and 104. Electric vehicles exacerbate this problem due to the weight of a typical electric motor and the normally high transmission ratio (e.g., 10:1) between the motor and the wheels. Additionally, given that electric vehicles use regenerative braking, transitions between positive and negative torque are more frequent and intense.

The primary concern with backlash in a vehicle's powertrain is the vibration and noise that results when the backlash within the various gear linkages is traversed, for example when a car shifts between acceleration and braking or vice versa. Each time the backlash is traversed, the vehicle's driver and passengers feel the car shutter or jerk, a feeling that is often accompanied by the noise of the gear teeth impacting against one another.

Car designers utilize a variety of techniques to overcome this issue, thereby providing a smoother, less jarring ride to their vehicle's passengers. In general, these techniques utilize a type of mechanical filter interposed between individual members of the powertrain. For example, a flexible rubber coupling may be interposed between a vehicle's driveshaft and the differential, the rubber coupling absorbing much of the vibration caused by powertrain backlash. In addition to mechanical filtering, car designers also utilize various engine control systems to perform this same function, where the control systems estimate the backlash and then use a feedback system to minimize its effects. Unfortunately, while filtering techniques do lessen the effects of powertrain backlash, they also lessen powertrain responsiveness. Accordingly, what is needed is a system that minimizes, if not all together eliminates, the effects of powertrain backlash without reducing vehicle responsiveness. The present invention provides such a control system.

SUMMARY OF THE INVENTION

The present invention provides a powertrain backlash control system for an electric vehicle (EV), the control system including (i) a first powertrain that includes one or more motors and is configured to propel the EV in a forward direction; (ii) a second powertrain that includes one or more motors and is configured to propel the EV in a rearward direction; and (iii) a vehicle controller that is coupled to the first and second powertrains, the vehicle controller configured to transmit a plurality of forward torque demands to the first powertrain and transmit a plurality of reverse torque demands to the second powertrain, wherein during in-gear EV operation the vehicle controller maintains at least a minimum forward torque demand on the first powertrain and maintains at least a minimum reverse torque demand on the second powertrain, wherein the minimum forward torque demand is greater than zero and the minimum reverse torque demand is greater than zero. During in-gear EV operation, when the EV is stopped the minimum forward torque demand is offset by the minimum reverse torque demand, thereby preventing EV movement in either a forward or rearward direction.

In one aspect, the control system may further include a throttle assembly coupled to the vehicle controller. The throttle assembly is configured to receive torque requests from the EV's driver and transmit the torque request to the vehicle controller, where the torque requests are selected from within a range of possible torque requests that include a range of forward torque requests and a range of reverse torque requests. After receiving the torque request, the vehicle controller transmits a corresponding torque demand to at least one of the first and second powertrains, where the corresponding torque demand is selected from the plurality of forward torque demands and the plurality of reverse torque demands.

In another aspect, when the torque request corresponds to a forward torque request the vehicle controller may be configured to compare the torque request to a preset value. If the torque request exceeds the preset value, the vehicle controller may be configured to temporarily cease transmitting reverse torque demands to the second powertrain and to transmit a forward torque demand to the second powertrain. Similarly, when the torque request corresponds to a rearward torque request the vehicle controller may be configured to compare the torque request to a second preset value. If the torque request exceeds the second preset value, the vehicle controller may be configured to temporarily cease transmitting forward torque demands to the first powertrain and to transmit a reverse torque demand to the first powertrain. The preset value may correspond to the maximum torque available from the first powertrain. The second preset value may correspond to the maximum torque available from the second powertrain.

In another aspect, when the torque request corresponds to a forward torque request the vehicle controller may be configured to compare the current vehicle speed to a preset value. If the current vehicle speed exceeds the preset value, the vehicle controller may be configured to temporarily cease transmitting reverse torque demands to the second powertrain and to transmit a forward torque demand to the second powertrain. Similarly, when the torque request corresponds to a rearward torque request the vehicle controller may be configured to compare the current vehicle speed to a second preset value. If the current vehicle speed exceeds the second preset value, the vehicle controller may be configured to temporarily cease transmitting forward torque demands to the first powertrain and to transmit a reverse torque demand to the first powertrain.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure. The term "battery pack" as used herein refers to one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system. As used herein, "forward torque" refers to torque applied in a forward direction of travel and "reverse torque" refers to torque applied in a rearward direction of travel. Accordingly, if a car is traveling in a forward direction, forward torque refers to motor torque that promotes and sustains forward motion of the car while reverse torque refers to motor torque that is applied in the opposite direction in order to cause the car to decelerate or travel in a reverse direction. Additionally, in an EV reverse torque may be applied via regenerative braking in order to slow the vehicle's forward travel and forward torque may be applied via regenerative braking in order to slow the vehicle's rearward travel.

In accordance with the invention, powertrain backlash is eliminated by maintaining motor torque within a particular powertrain in the same direction at all times. When applied to a vehicle where it is necessary to provide means of travel in both forward and rearward directions, it will be appreciated that the invention is limited to EV's that include at least two powertrains, one for propelling the vehicle in the forward direction and one for propelling the vehicle in the rearward direction.

Figure 1:
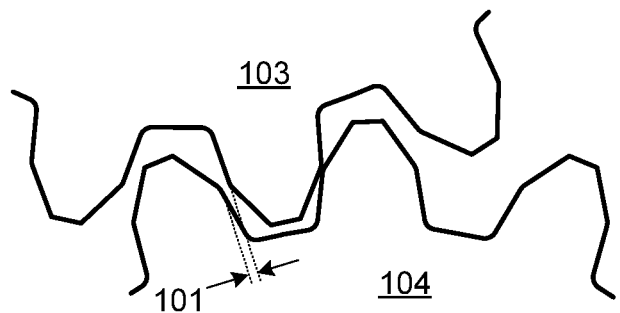
FIG. 1 illustrates backlash between two gears, where only a portion of each of the gears is shown.
Figure 2:
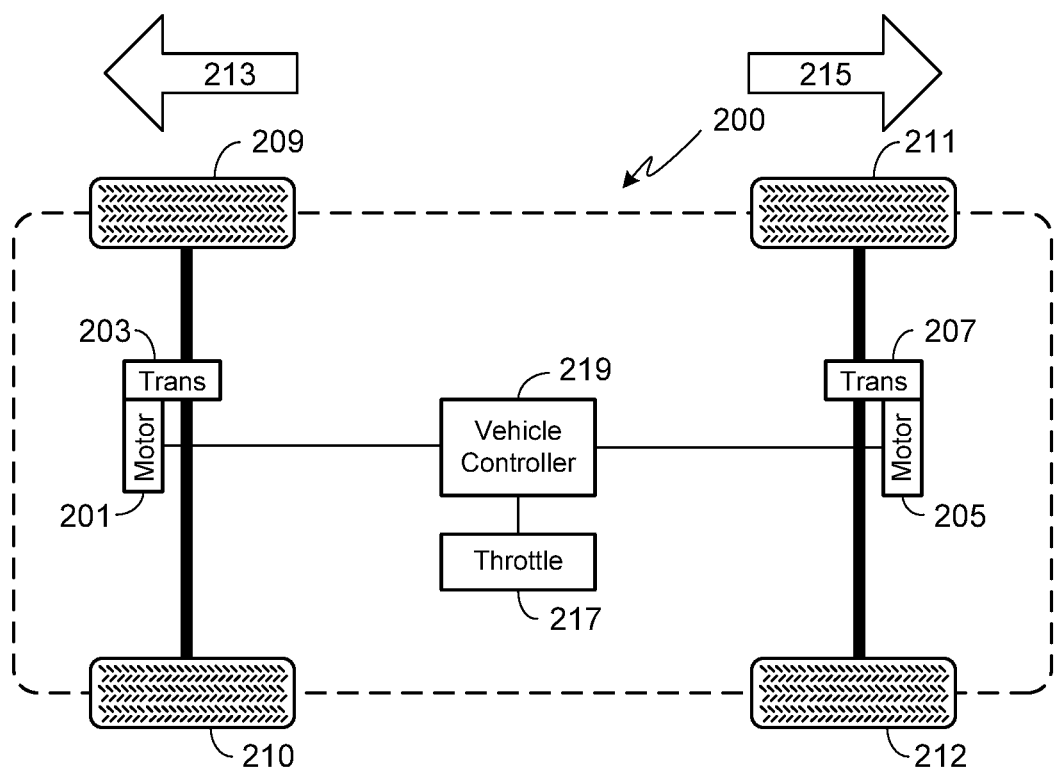
FIG. 2 illustrates a preferred embodiment of the invention in an EV with two motors.

FIG. 2 schematically illustrates an implementation of the preferred embodiment. As shown, EV 200 includes a first motor 201 and transmission 203 and a second motor 205 and transmission 207. Motor 201/transmission 203 provides torque to wheels 209 and 210 while motor 205/transmission 207 provides torque to wheels 211 and 212.

To eliminate the previously described problem of powertrain backlash, motor 201 and transmission 203 only provide forward torque, thereby propelling vehicle 200 in a direction 213. Similarly, motor 205 and transmission 207 only provide reverse torque, thereby propelling vehicle 200 in a direction 215. To prevent backlash, motor 201 always provides forward torque while motor 205 always provides reverse torque. The amount of torque applied by either motor depends upon the driver's desired direction of travel. For example, if the driver is accelerating in a forward direction, i.e., direction 213, then a large forward torque is generated by motor 201. At the same time, a small reverse torque is generated by motor 205. The amount of reverse torque generated by motor 205 is sufficient to ensure that there is no backlash in that powertrain when the driver wishes to decelerate or reverse direction, but small enough to have a relatively insignificant impact on forward vehicle travel and overall vehicle efficiency. When the driver decides to decelerate, assuming that the vehicle utilizes regenerative braking in addition to, or in lieu of, friction braking, then the forward torque generated by motor 201 is reduced and the reverse torque generated by motor 205 is increased. Similarly if the driver wishes to travel in a rearward direction, i.e., direction 215, then a large reverse torque is generated by motor 205 while simultaneously a small forward torque is generated by motor 201. As in the previous example, the amount of forward torque generated by motor 201 is sufficient to ensure that there is no backlash in that powertrain while being small enough to have a relatively insignificant impact on rearward vehicle travel and overall vehicle efficiency. Note that when the vehicle is stationary and in gear (i.e., as opposed to being parked), a small amount of forward torque is generated by motor 201 and a small amount of reverse torque is generated by motor 205, the amount of forward torque being sufficient to counter the reverse torque generated by motor 205 without being large enough to cause forward vehicle travel. Similarly, the amount of reverse torque is sufficient to counter the forward torque generated by motor 201 without being large enough to cause rearward vehicle travel.

Figure 3:
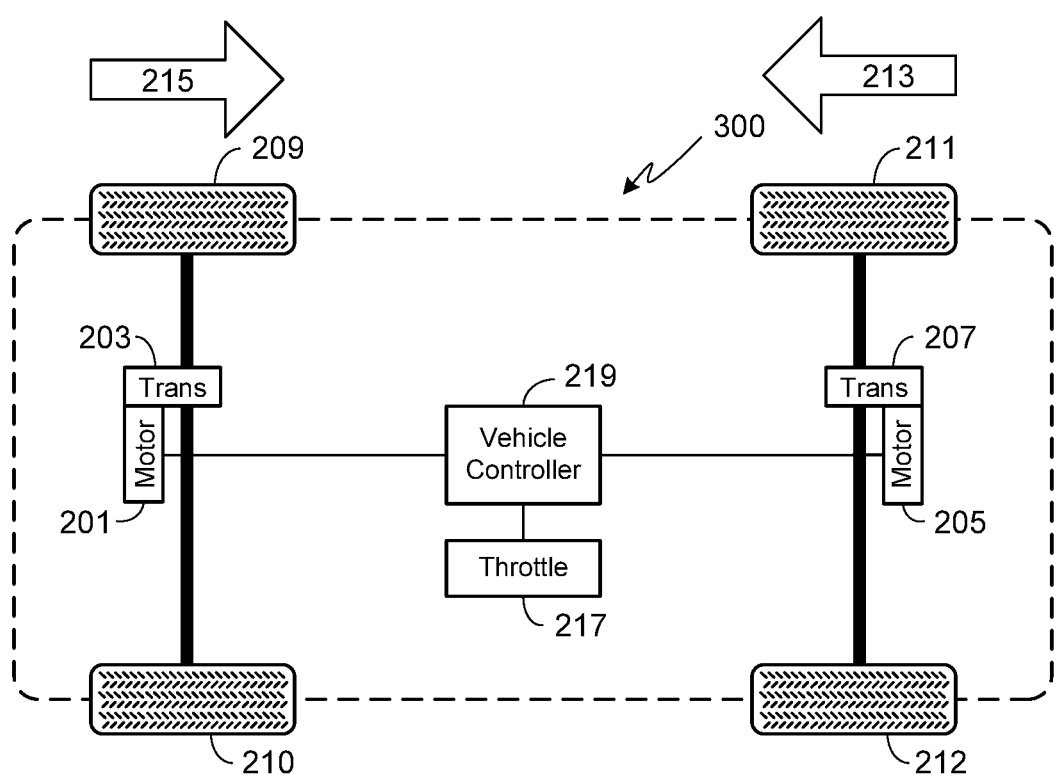
FIG. 3 illustrates an embodiment similar to that shown in FIG. 2, except for the direction of torque applied by each of the vehicle's motors.

In the previous example, motor 201 only provided forward torque and motor 205 only provided reverse torque. It should be understood that the same benefits are achieved if motor 201 is only used to generate reverse torque (i.e., causing vehicle travel in direction 215) and motor 205 is only used to generate forward torque (i.e., causing vehicle travel in direction 213). Vehicle 300 shown in FIG. 3 illustrates this configuration.

Figure 4A:
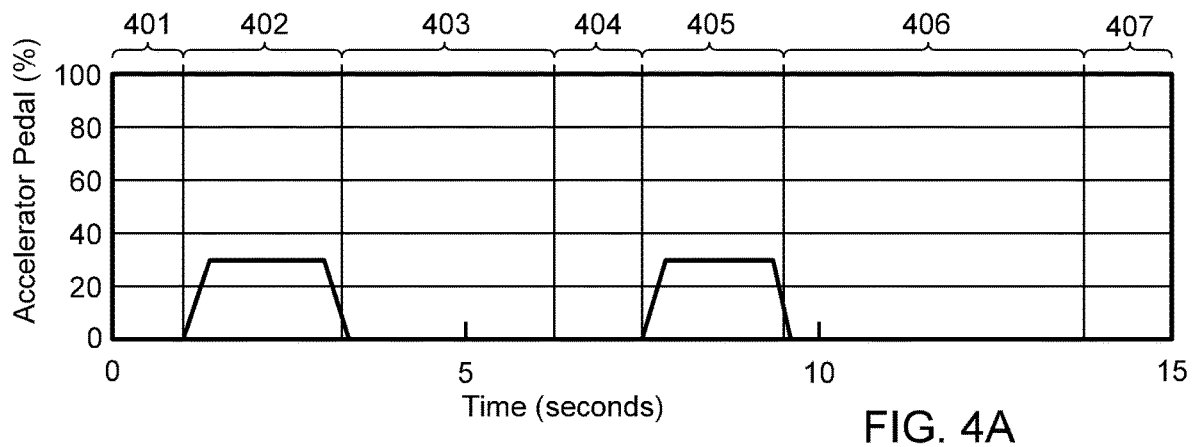
FIGS. 4A-C illustrate the invention using a fictitious drive cycle, with FIG. 4A graphically illustrating accelerator pedal depression, FIG. 4B graphically illustrating vehicle speed, and FIG. 4C graphically illustrating motor torque.
Figure 4B:
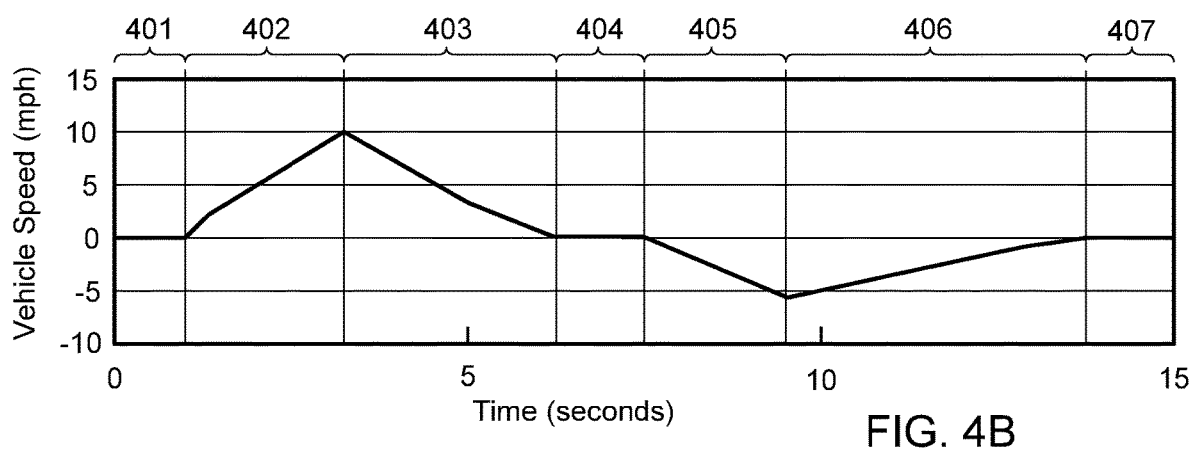
Figure 4C:
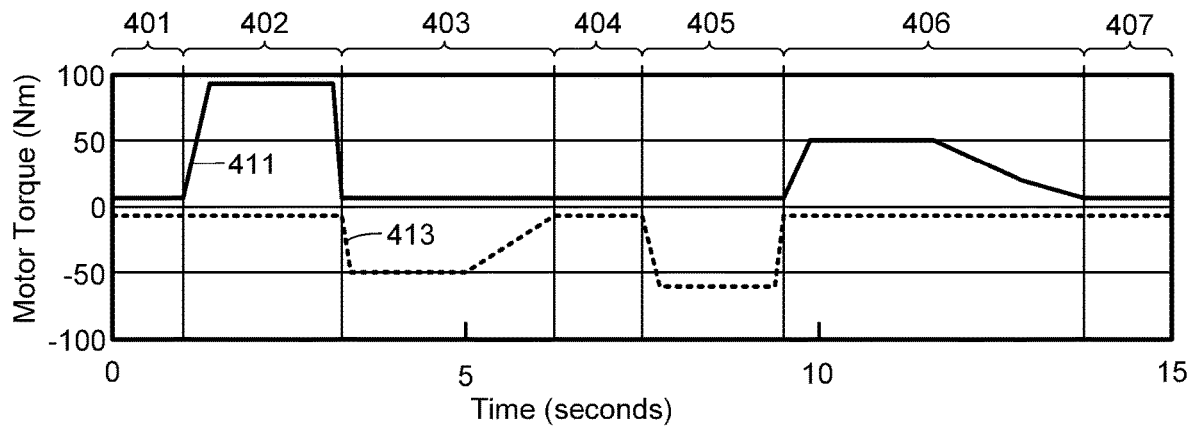

FIGS. 4A-C illustrate the invention using a fictitious drive cycle. The drive cycle in this example is divided into seven time periods, specifically (i) vehicle stopped (region 401); (ii) vehicle accelerating in a forward direction (region 402); (iii) vehicle decelerating using regenerative braking (region 403); (iv) vehicle stopped (region 404); (v) vehicle accelerating in a rearward direction (region 405); (vi) vehicle decelerating using regenerative braking (region 406); and (vii) vehicle stopped (region 407). FIG. 4A graphically illustrates depression of the accelerator pedal, where the accelerator pedal has a range of motion between fully depressed (i.e., 100% depressed) and fully released (i.e., 0% depressed). FIG. 4B graphically illustrates vehicle speed, where forward vehicle motion is shown as a positive value and rearward vehicle motion is shown as a negative value. FIG. 4C graphically illustrates motor torque, where forward torque is shown as a positive value (solid line 411) and reverse torque is shown as a negative value (dashed line 413). Due to the use of the invention, forward torque remains positive and reverse torque remains negative, thereby eliminating the backlash caused when a motor changes sign (i.e., going from forward torque to reverse torque or reverse to forward torque).

Assuming the use of the embodiment illustrated in FIG. 2, the forward torque in this fictitious drive cycle is generated by motor 201 and the reverse torque is generated by motor 205. Assuming the use of the embodiment illustrated in FIG. 3, the forward torque in this fictitious drive cycle is generated by motor 205 and the reverse torque is generated by motor 201. Note that in the example provided in FIGS. 4A-C, during the second time period (region 402) the car is continually accelerating, i.e., the car never reaches a steady state speed. Similarly, during the fifth time period (region 405) the car is continually accelerating in a rearward direction, i.e., the car never reaches a steady state speed.

Figure 5:
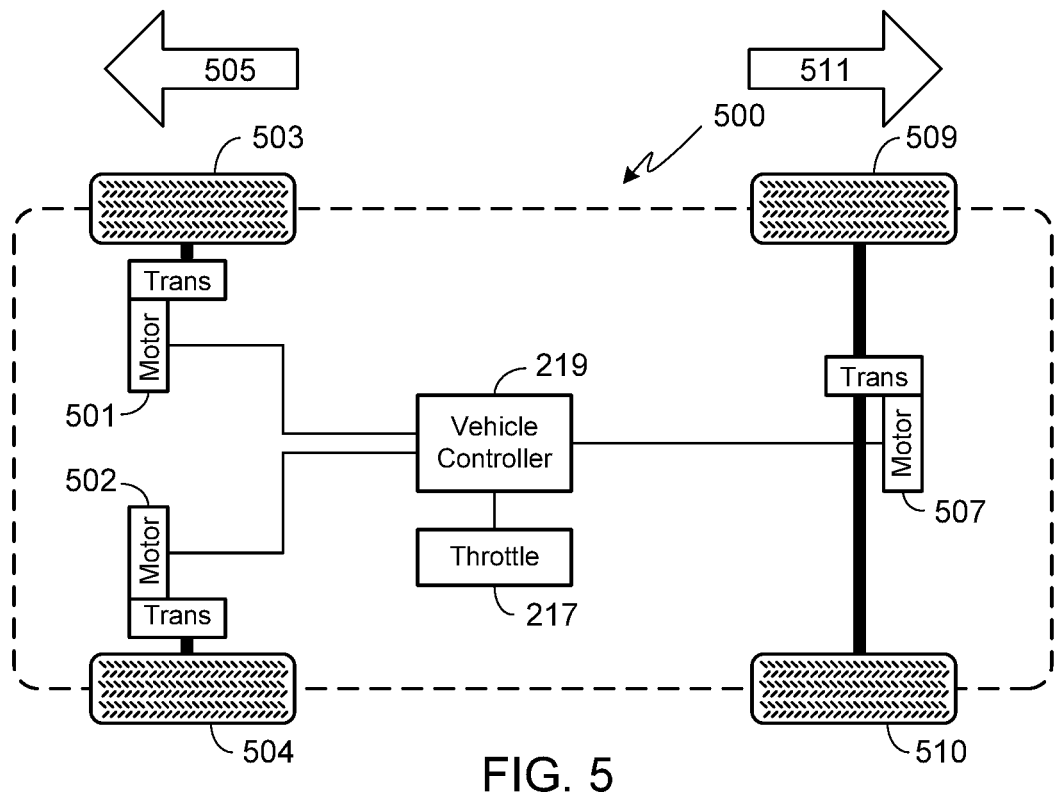
FIG. 5 illustrates an embodiment similar to those shown in FIGS. 2 and 3, except that three motors are used rather than two.
Figure 6:
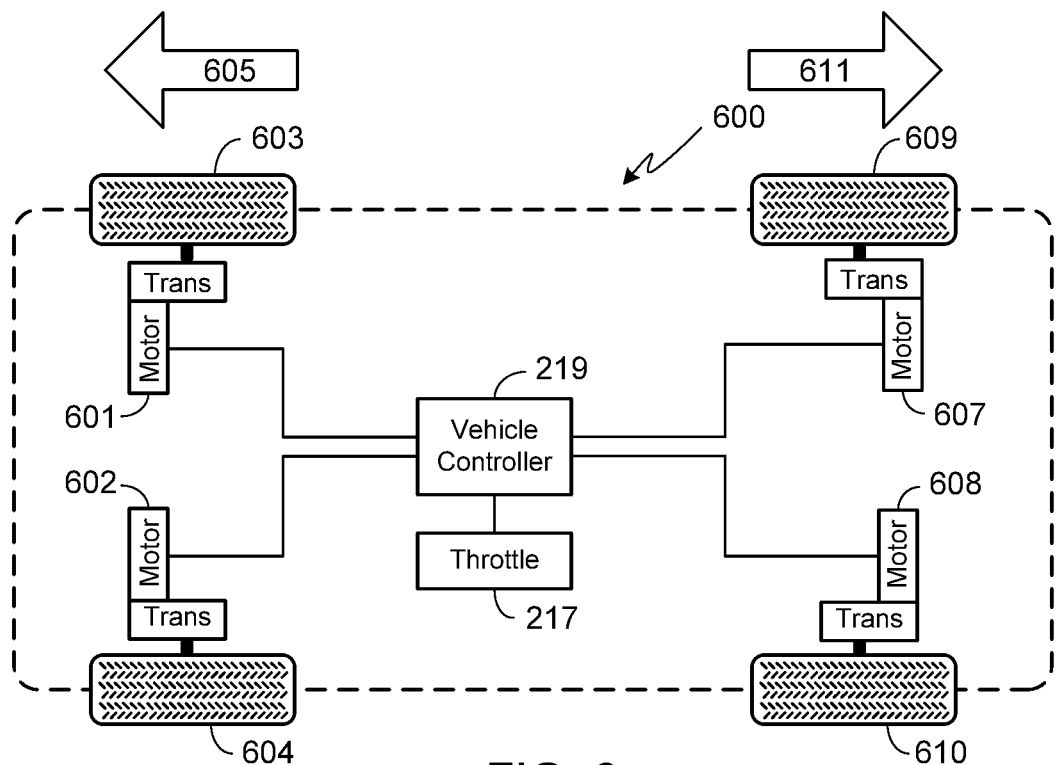
FIG. 6 illustrates an embodiment similar to those shown in FIGS. 2 and 3, except that four motors are used rather than two.

While the illustrations of the invention provided above utilize two motors, i.e., one motor providing forward torque and one motor providing reverse torque, as previously noted the invention is equally applicable to EVs utilizing more than two motors. For example, in the embodiment illustrated in FIG. 5, two motors 501 and 502 provide torque (e.g., forward torque) to wheels 503 and 504 in order to propel vehicle 500 in a direction 505. In this embodiment, a single motor 507 provides torque (e.g., reverse torque) to wheels 509 and 510 in order to propel vehicle 500 in a direction 511. In yet another example, vehicle 600 (FIG. 6) utilizes two motors 601 and 602 to provide torque (e.g., forward torque) to wheels 603 and 604 in order to propel vehicle 600 in a direction 605, and two motors 607 and 608 to provide torque (e.g., reverse torque) to wheels 609 and 610 in order to propel vehicle 600 in a direction 611.

The approach described above eliminates powertrain backlash, and therefore eliminates the jerkiness and noise that typically accompanies powertrain backlash. However, as each motor continually applies torque in opposition to the torque generated by another of the vehicle's motors, vehicle powertrain efficiency is degraded. Although the degree of degradation is minimal given that only a small amount of torque must be generated in order to eliminate powertrain backlash, it will be appreciated that even a small amount of degradation may be undesirable in some scenarios. In addition to the loss of efficiency due to at least one motor generating torque in opposition to the torque generated by at least one other motor, the approach described above does not take full advantage of the EV's combined motor capabilities. Clearly in a two motor EV, additional acceleration and top speed can be achieved when both motors are operating in unison, rather than counter to one another. To overcome these limitations, the inventor envisions several modifications to the above system.

In one modification of the above described system, the vehicle's system controller monitors the torque demand (Ta) requested by the driver. Torque demand is requested by the driver by pressing down, or otherwise engaging, the accelerator (also referred to as the throttle). Under normal conditions and as described above, as the driver increases their torque demand, the motor(s) generating torque in the requested direction (i.e., either forward torque or reverse torque) increases the generated torque while the motor(s) generating torque in the opposite direction (i.e., either reverse torque or forward torque) generates minimal torque, thereby eliminating powertrain backlash. However, in this modified approach, when the driver requests torque in excess of that which can be generated by the motor(s) generating torque in the requested direction, the motor(s) used to generate torque in the opposite direction provides additional torque in the requested direction. For example, assuming a two motor configuration as illustrated in FIG. 2, if the driver requests forward motion (i.e., by placing the car in a forward gear) and presses down on the accelerator (or otherwise activates throttle 217) to such a degree that the torque demand (Td) cannot be met by the maximum torque ($T_{P-max}$) generated by motor 201, then in the modified system the vehicle controller 219 would utilize motor 205 to generate additional forward torque. In other words, if $T_d$ is greater than $T_{P-max}$, then the vehicle controller utilizes both motors 201 and 205 to meet the torque demand.

It should be understood that in the above-modified system, system controller 219 can be configured to compare $T_d$ to a preset value rather than $T_{P-max}$. For example, system controller 219 can be configured to compare $T_d$ to a torque value that is 90% of $T_{P-max}$, thereby avoiding placing the powertrain under unnecessary stress.

Figure 7A:
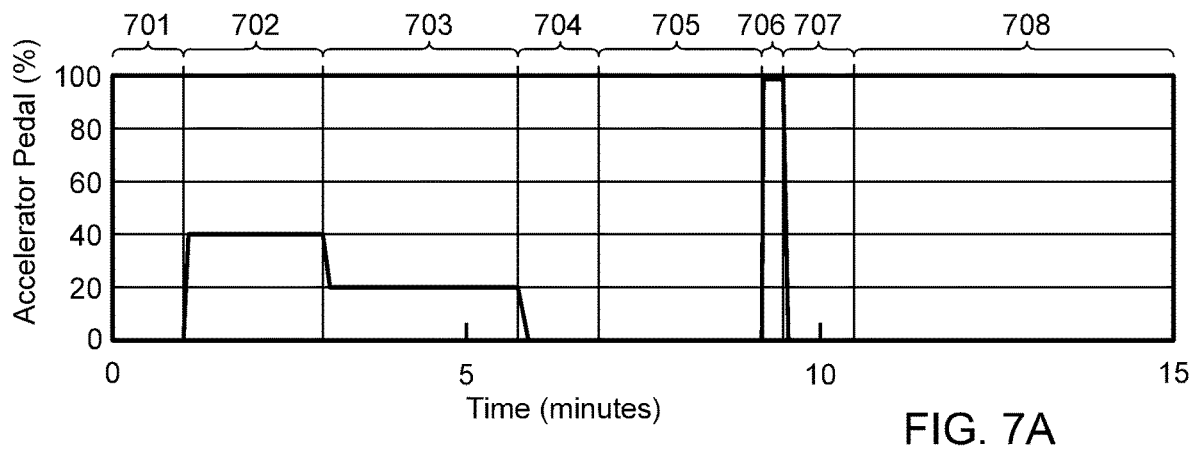
FIGS. 7A-C illustrate a system modification using a fictitious drive cycle, with FIG. 7A graphically illustrating accelerator pedal depression, FIG. 7B graphically illustrating vehicle speed, and FIG. 7C graphically illustrating motor torque.
Figure 7B:
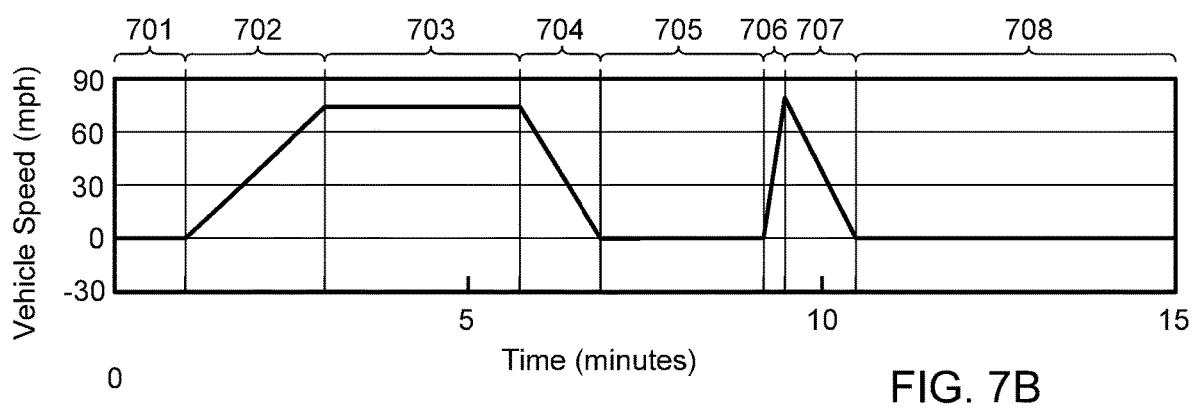
Figure 7C:
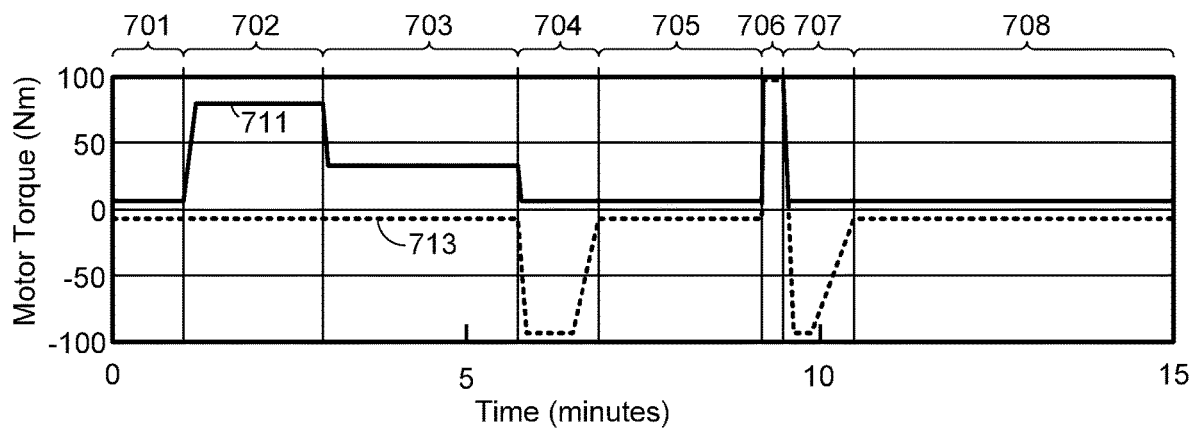

FIGS. 7A-7C illustrate the modified system using a fictitious drive cycle. The drive cycle in this example is divided into eight time periods, specifically (i) vehicle stopped (region 701); (ii) vehicle gradually accelerating in a forward direction (region 702); (iii) vehicle maintaining a constant speed (region 703); (iv) vehicle decelerating using regenerative braking (region 704); (v) vehicle stopped (region 705); (vi) vehicle rapidly accelerating in a forward direction (region 706); (vii) vehicle decelerating using regenerative braking (region 707); and (viii) vehicle stopped (region 708). FIG. 7A graphically illustrates depression of the accelerator pedal. FIG. 7B graphically illustrates vehicle speed. FIG. 7C graphically illustrates motor torque, where torque provided by the motor(s) primarily used for forward torque is shown as a solid line 711 and torque provided by the motor(s) primarily used for reverse torque is shown as a dashed line 713. Note that during period 706 when the driver is demanding rapid acceleration by pressing the accelerator pedal to the floor (e.g., 100% pedal depression), line 713 briefly switches from a negative value (reverse torque) to a positive value (forward torque). As such, for a brief period of time both the forward torque powertrain(s) and the reverse torque powertrain(s) are supplying forward torque to the vehicle. Once the demand for forward torque ($T_d$) drops below the maximum torque ($T_{P-max}$) available from the forward torque powertrain(s), or below a preset torque value, the reverse torque powertrain(s) switches back to a negative torque value as shown.

In another modification of the system of the invention, the vehicle's system controller monitors vehicle speed. During low speed operation, the vehicle maintains forward torque on the powertrain(s) providing forward motion, and reverse torque on the powertrain(s) providing rearward motion, thereby eliminating powertrain backlash. As such, during low speed operation of the vehicle when powertrain backlash is most noticeable, the system operates as described initially and illustrated in FIGS. 4A-4C. Once a preset speed is reached, for example 30 mph, vehicle controller 219 reverts to conventional powertrain operation where all of the EV's powertrains (i.e., forward torque powertrain(s) and reverse torque powertrain(s)) operate in unison to generate torque in the same direction. Operation in this manner continues until vehicle speed drops below the preset speed, at which time the system reverts to the system of the invention whereby backlash is eliminated by maintaining forward torque on the powertrain(s) providing forward torque and maintaining rearward torque on the powertrain(s) providing reverse torque.

Figure 8A:
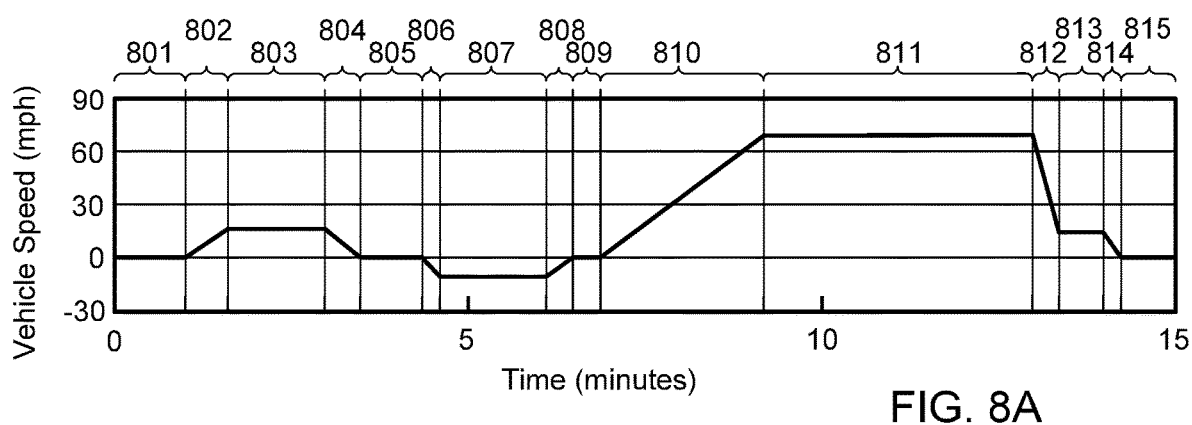
FIGS. 8A-B illustrate a system modification using a fictitious drive cycle, with FIG. 8A graphically illustrating vehicle speed and FIG. 8B graphically illustrating motor torque.
Figure 8B:
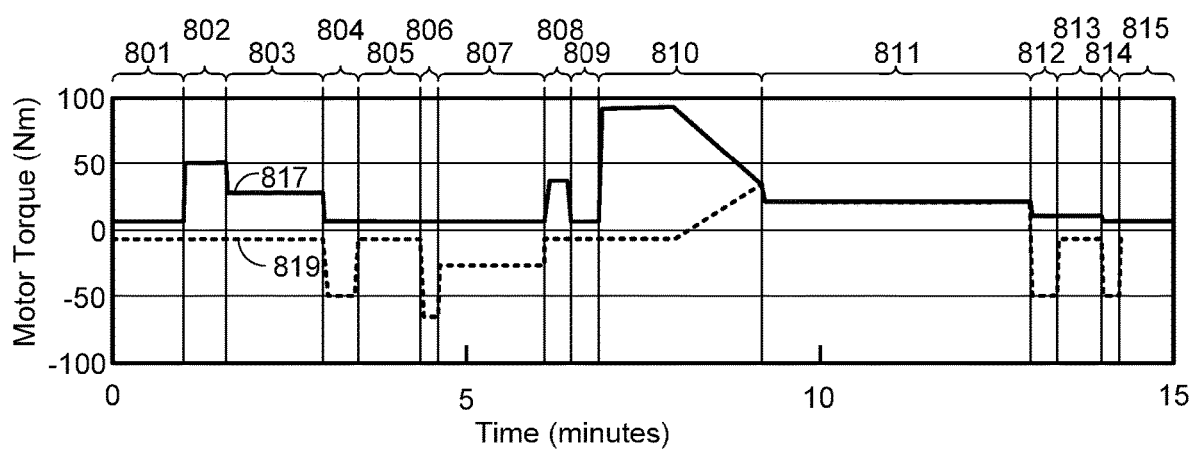

FIGS. 8A and 8B illustrate the speed sensitive modified system using a fictitious drive cycle. In this illustration it is assumed that the preset speed is set at approximately 30 mph. FIG. 8A graphically illustrates vehicle speed while FIG. 8B graphically illustrates motor torque, where torque provided by the powertrain(s) primarily used for forward torque is shown as a solid line 817 and torque provided by the powertrain(s) primarily used for reverse torque is shown as a dashed line 819. The drive cycle in this example is divided into fifteen time periods, specifically (i) vehicle stopped (region 801); (ii) vehicle gradually accelerating in a forward direction (region 802); (iii) vehicle maintaining a constant speed of approximately 15 mph (region 803); (iv) vehicle decelerating using regenerative braking (region 804); (v) vehicle stopped (region 805); (vi) vehicle gradually accelerating in a rearward direction (region 806); (vii) vehicle maintaining a constant speed in a rearward direction of approximately 10 mph (region 807); (viii) vehicle decelerating using regenerative braking (region 808); (ix) vehicle stopped (region 809); (x) vehicle gradually accelerating to approximately 70 mph (region 810); (xi) vehicle maintaining a constant speed of approximately 70 mph (region 811); (xii) vehicle decelerating to approximately 15 mph (region 812); (xiii) vehicle maintaining a constant speed in a forward direction of approximately 15 mph (region 813); (xiv) vehicle decelerating using regenerative braking (region 814); and (xv) vehicle stopped (region 815). Note that during time period 810 as the vehicle gradually accelerates from 0 mph to 70 mph, forward torque is initially only provided by the forward powertrain(s). After the speed surpasses the preset speed (e.g., 30 mph), forward torque is also provided by the reverse powertrain(s). Both the forward and reverse torque powertrains provide forward torque during time period 811 when the car is cruising at 70 mph. As the vehicle decelerates to 15 mph during deceleration period 812, the reverse torque powertrain(s) provides regenerative braking. Then when the vehicle is traveling at a constant 15 mph (region 813), only the forward torque powertrain(s) provides torque.

It should be understood that while separate examples are provided herein for modified systems in which (i) torque demand is used to determine when the EV's forward and reverse torque powertrains operate in unison and (ii) vehicle speed is used to determine when the EV's forward and reverse torque powertrains operate in unison, the inventor clearly envisions a system in which both of these modifications are combined into a single system. In such a system under normal operation, i.e., when the torque demand, $T_d$, does not exceed a preset torque value (e.g., $T_{P\text{-}max}$) and the vehicle speed does not exceed a preset value (e.g., 30 mph), forward torque is maintained in the forward torque powertrain(s) and reverse torque is maintained in the reverse torque powertrain(s) in order to eliminate powertrain backlash. Whenever the torque demand exceeds the preset torque value or the vehicle speed exceeds the preset value, both the forward and reverse torque powertrains operate together to generate torque in the desired direction.

As specific powertrain torque values depend on the specifics of the powertrain in question (e.g., motor characteristics, etc.), it should be understood that the torque values provided in the exemplary drive cycles shown in FIGS. 4A-C, 7A-C, and 8A/8B are only intended to illustrate, not limit, the invention.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A powertrain backlash control system, comprising:
   a first powertrain, said first powertrain configured to propel an electric vehicle (EV) in a forward direction, said first powertrain comprising a first motor;
   a second powertrain, said second powertrain configured to propel said EV in a rearward direction, said second powertrain comprising a second motor; and
   a vehicle controller coupled to said first powertrain and to said second powertrain, said vehicle controller configured to transmit a plurality of forward torque demands to said first powertrain and configured to transmit a plurality of reverse torque demands to said second powertrain, wherein during in-gear EV operation said vehicle controller maintains at least a minimum forward torque demand on said first powertrain and maintains at least a minimum reverse torque demand on said second powertrain, wherein said minimum forward torque demand is greater than zero, and wherein said minimum reverse torque demand is greater than zero, said vehicle controller configured to (i) compare a current vehicle speed to a preset speed value when a torque request corresponds to a forward torque request selected from a range of forward torque requests, and to (ii) temporarily cease transmitting reverse torque demands to said second powertrain and to transmit a forward torque demand to said second powertrain when said current vehicle speed exceeds said preset speed value.

2. The powertrain backlash control system of claim 1, wherein during in-gear EV operation when said EV is stopped said minimum forward torque demand is offset by said minimum reverse torque demand to prevent EV movement in said forward direction and to prevent EV movement in said rearward direction.

3. The powertrain backlash control system of claim 1, further comprising a throttle assembly coupled to said vehicle controller, said throttle assembly configured to receive the torque request from a driver of said EV and transmit said torque request to said vehicle controller, said torque request selected from within a range of possible torque requests, said range of possible torque requests comprising the range of forward torque requests and a range of reverse torque requests.

4. The powertrain backlash control system of claim 3, wherein said vehicle controller transmits a corresponding torque demand to at least one of said first powertrain and said second powertrain when said vehicle controller receives said torque request from said throttle assembly, wherein said corresponding torque demand is selected from said plurality of forward torque demands and said plurality of reverse torque demands.

5. The powertrain backlash control system of claim 3, said vehicle controller configured to compare said torque request to a preset torque value when said torque request corresponds to a forward torque request selected from said range of forward torque requests.

6. The powertrain backlash control system of claim 5, said vehicle controller configured to temporarily cease transmitting the reverse torque demands to said second powertrain and to transmit the forward torque demand to said second powertrain when said torque request exceeds said preset torque value.

7. The powertrain backlash control system of claim 5, said preset torque value corresponding to a maximum torque available from said first powertrain.

8. The powertrain backlash control system of claim 5, said vehicle controller configured to compare said torque request to a second preset value when said torque request corresponds to a reverse torque request selected from said range of reverse torque requests.

9. The powertrain backlash control system of claim 8, said vehicle controller configured to temporarily cease transmitting forward torque demands to said first powertrain and to transmit a reverse torque demand to said first powertrain when said torque request exceeds said second preset value.

10. The powertrain backlash control system of claim 8, said second preset value corresponding to a maximum torque available from said second powertrain.

11. The powertrain backlash control system of claim 3, said vehicle controller configured to compare said current vehicle speed to a second preset value when said torque request corresponds to a reverse torque request selected from said range of reverse torque requests.

12. The powertrain backlash control system of claim 11, said vehicle controller configured to temporarily cease transmitting forward torque demands to said first powertrain and to transmit a reverse torque demand to said first powertrain when said current vehicle speed exceeds said second preset value.

13. The powertrain backlash control system of claim 1, said first powertrain further comprising a third motor.

14. The powertrain backlash control system of claim 1, said second powertrain further comprising a fourth motor.

15. The powertrain backlash control system of claim 1, wherein the vehicle controller continues transmitting the forward torque demand to the second powertrain until the current vehicle speed no longer exceeds the preset speed value.

16. The powertrain backlash control system of claim 1, wherein the vehicle controller continues transmitting the reverse torque demands to the second powertrain during any situation where both: (i) the torque request does not exceed a preset torque value, and (ii) the current vehicle speed does not exceed the preset speed value.

17. The powertrain backlash control system of claim 16, wherein the vehicle controller ceases transmitting the reverse torque demands to the second powertrain, and transmits the forward torque demand to the second powertrain, during any situation where: (i) the torque request exceeds the preset torque value, (ii) the current vehicle speed exceeds the preset speed value, or (iii) the torque request exceeds the preset torque value and the current vehicle speed exceeds the preset speed value.

* * * * *